United States Patent
Florin

(10) Patent No.: US 6,394,459 B1
(45) Date of Patent: May 28, 2002

(54) MULTI-CLEARANCE LABYRINTH SEAL DESIGN AND RELATED PROCESS

(75) Inventor: Mark Arne Florin, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/595,517

(22) Filed: Jun. 16, 2000

(51) Int. Cl.[7] .............................................. F16J 15/447
(52) U.S. Cl. ....................... 277/303; 277/412; 277/418; 277/420; 415/174.5
(58) Field of Search ................... 277/303, 412, 277/416, 418, 419, 420; 415/173.5, 173.2, 174.5

(56) References Cited

U.S. PATENT DOCUMENTS

| 3,989,410 A | 11/1976 | Ferrari |
| 4,148,494 A | 4/1979 | Zelahy et al. |
| 4,285,770 A | 8/1981 | Chi et al. |
| 4,513,975 A | 4/1985 | Hauser et al. |
| 5,002,288 A | 3/1991 | Morrison et al. |
| 5,029,876 A | 7/1991 | Orlando et al. |
| 5,143,383 A | 9/1992 | Glynn et al. |
| 5,224,713 A | 7/1993 | Pope |
| 5,281,090 A | 1/1994 | Starling |
| 5,749,584 A | 5/1998 | Skinner et al. |
| 5,890,873 A | 4/1999 | Willey |

FOREIGN PATENT DOCUMENTS

JP         11-44201      *  2/1999

* cited by examiner

Primary Examiner—Anthony Knight
Assistant Examiner—Alison K. Pickard
(74) Attorney, Agent, or Firm—Nixon & Vanderhye P.C.

(57) ABSTRACT

A packing ring seal assembly for use in a steam turbine for minimizing leakage flow between stationary and rotating steam path parts includes a stationary annular seal ring having a plurality of axially spaced, annular sealing teeth extending in a radial inward direction and adapted to cooperate with sealing surfaces on a rotating component of the steam turbine, wherein radial clearance between the sealing teeth and the sealing surfaces varies by predetermined amounts.

14 Claims, 1 Drawing Sheet

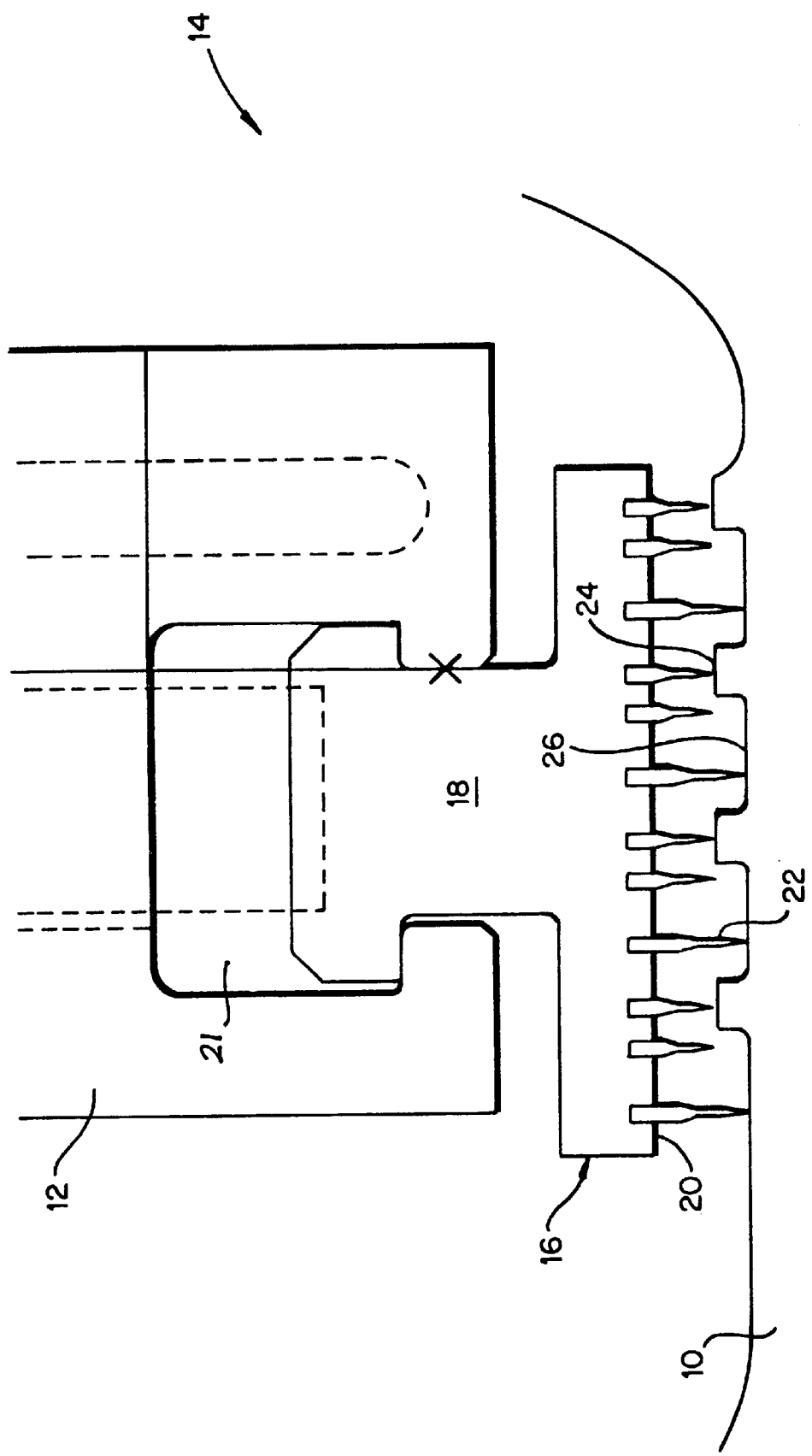

MULTI-CLEARANCE LABYRINTH SEAL DESIGN AND RELATED PROCESS

BACKGROUND OF THE INVENTION

This invention relates to rotary machines and, specifically, to minimizing leakage flow between stationary and rotating parts of a packing assembly in a steam turbine.

Packing rings are used in steam turbines as a means of minimizing leakage flows between fixed and rotating steam path parts. These packing rings consist of arcuate ring segments, each of which has multiple axially spaced teeth that are either machined integrally with, or inserted into the arcuate ring segments. The segments together provide an annular seal. The packing ring segments are installed in grooves machined in mating stationary parts of the turbine such as diaphragms or casings, and are radially positioned to provide a close fit with a rotating part of the turbine, e.g., the rotor. Typically, in the packing seal area, the rotor is machined to provide axially spaced, annular lands that, along with the rotor surfaces between the lands, are regarded as part of the packing assembly. The close fit between the teeth and the rotor is called a "clearance," and minimizing this clearance is essential in maximizing steam turbine efficiency.

Operational transient conditions of steam turbines during startups, shutdowns or load swings will often cause the rotating part to contact (i.e., "rub") the stationary part and wear the packing teeth to a larger clearance. This "rub," or wear, produces a mushroom shaped tooth profile, which will allow more leakage than a sharp tooth at an equivalent clearance. Normal turbine operation will also wear the packing teeth to a larger clearance. The amount of wear in a packing ring that is typical for a steam turbine can be described statistically for different steam turbine configurations based on field inspection data obtained when the units undergo maintenance. This data has been accumulated and has been analyzed to determine the Means and Standard Deviations of the wear data broken down by turbine stage number and code type.

Normal steam turbine design practice is to design the packing ring hardware to provide a tight, constant initial clearance and allow the clearances to open up during a startup by "rubbing in" or wearing eventually over time, as described above. An important design parameter of the packing ring is that all of the packing teeth are machined to provide the same clearance on every tooth within an individual packing ring. Thus, when the packing ring wears, all of the teeth clearances within the packing ring increase to approximately the same amount. This is consistent with the data taken from the field.

BRIEF SUMMARY OF THE INVENTION

This invention comprises apparatus and a method for minimizing leakage flow between the stationary and rotating parts of a rotary machine. Specifically, a packing seal assembly in a steam turbine is designed to have radial clearances that vary along the axial extent of the seal. This approach minimizes the leakage flow over the life of the seal by accounting for operational transients and expected seal wear. The invention described herein is described in connection with a labyrinth type seal but this invention could also be applied to other seal configurations. For example, this invention is applicable to both integral and inserted teeth packing ring designs of fixed or variable clearance, as well as packing rings that contain brush seals. This invention is also applicable to spill strip bucket tip seals of different designs.

The optimization of the seal is accomplished by either (a) machining individual teeth within a packing ring to different heights, and/or (b) machining the rotor lands to different heights. Either or both of these alternatives will result in non-constant radial clearances between the stationary (i.e., packing ring) and rotating (i.e., rotor lands) parts. Thus, as the turbine rotor wears away any tooth due to transient operation (i.e., "rub"), there will still be sharp teeth remaining within the seal assembly. The location and number of teeth at a given clearance can be optimized to provide the minimal leakage for the expected operational conditions of the machine. This can be accomplished by developing a transfer function between the packing ring flow coefficient (i.e., leakage rate) and the expected wear of a given machine configuration. The optimized design would be statistically based because the wear data follows a statistically defined distribution as described further below.

Accordingly, in its broader aspects, the invention relates to a packing ring seal for use in a steam turbine for minimizing leakage flow between stationary and rotating steam path parts comprising a stationary annular seal ring having a plurality of axially spaced, annular sealing teeth extending in a radial inward direction and adapted to cooperate with sealing surfaces on a rotating component of the steam turbine, wherein radial clearance between the sealing teeth and the sealing surfaces varies by predetermined amounts.

In another aspect, the invention relates to a method of minimizing flow leakage axially along a rotatable machine shaft, between a stationary component surrounding the machine shaft and a plurality of surfaces rotatable with the machine shaft, the method comprising the steps of:

a) providing a labyrinth seal ring having a plurality of axially spaced, annular teeth;

b) mounting said seal ring above the machine shaft such that the plurality of axially spaced teeth cooperate with surfaces rotatable with mid machine shaft; and c) establishing predetermined varying radial clearances between the axially spaced teeth and the surfaces rotatable with the machine shaft.

BRIEF DESCRIPTION OF THE DRAWINGS

The FIGURE section through a steam turbine packing seal in accordance with the invention.

DETAILED DESCRIPTION OF THE INVENTION

The FIGURE illustrates a packing ring assembly, and specifically a labyrinth seal of the type found in rotary machines, and in this case, in a steam turbine. The steam turbine includes a shaft or rotor 10 disposed and supported in a housing, partially shown at 12. A labyrinth type packing seal, 14 is disposed between the rotor 10 and a fixed part of the housing 12, and includes a seal ring 16 surrounding the rotor 10 and separating high and low pressure regions on axially opposite sides of the seal ring 16. While only one seal ring is illustrated, it will be appreciated that multiple labyrinth seals are provided about the rotor, proximate the various turbine stages.

Each seal ring 16 is formed of an annular array of arcuate seal segments 18 (one shown), each having a sealing face 20 and a plurality of radially inwardly projecting, axially spaced, sharp sealing teeth 22. The teeth are of a "hi-lo" design, with close clearances between the teeth 22 and raised lands 24 and surfacer 26 between the raised lands. The labyrinth seal thus provides a relatively large number of barriers (i.e., the teeth) to the flow of fluid from a high pressure region to a low pressure region on opposite sides of the seal. Because of the "hi-lo" design, the air is forced to flow through a tortuous path, creating a pressure drop across the seal.

The seal segments 18 are typically spring-backed and are thus free to move radially when subject to severe rotor/seal interference (or rubbing). In some designs, the springs maintain the segments radially away from the rotor 10 on startup and shutdown, but with fluid pressure in a chamber 21 between the seal segments and housing displacing the segments 18 toward the rotor 10 as the latter is brought up to speed.

The assembled clearance between the teeth 22 and rotor surfaces 24, 26 has been constant for all of the packing teeth across the packing ring. This constant radial clearance results because all of the stationary seal teeth 22 and rotor lands 24 are machined to provide the desired constant clearance. On steam turbines manufactured by the assignee of this invention, this clearance is typically 0.015 or 0.025 inches at initial assembly. In accordance with this invention, however, the clearance varies for at least some if not all of the teeth, within a range of from about 0.015 to about 0.045 inch. The variance is predetermined and well outside the manufacturing tolerance for either the 0.015 clearance or the 0.025 clearance previously used. The exact combination of individual tooth/rotor land heights, and thus clearance, would be set based on the statistical distribution of tooth wear. This design can be accomplished by machining the individual teeth 22 (or groups of teeth) and/or the rotor lands 24, to different diameters at the final machining stage of the packing ring. The varied pattern of predetermined clearances, however, may or may not be regular or fixed, i.e., it may be any mix of clearances within the desired range, based on historical wear data for the sealing teeth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A packing ring seal assembly for use in a steam turbine for minimizing leakage flow between stationary and rotating steam path parts comprising:

a stationary annular seal ring having a plurality of axially spaced, annular, sharp sealing teeth extending in a radial direction and adapted to cooperate with sealing surfaces on a rotating component of the steam turbine, wherein radial clearances between at least some of said sharp sealing teeth and said sealing surfaces are determined as a function of statistical tooth wear and vary within a range of about 0.015 to about 0.045 inch.

2. The packing seal assembly of claim 1 wherein said sealing surfaces comprise a plurality of raised lands and a plurality of surfaces between said raised lands.

3. The packing ring seal assembly of claim 2 wherein said variations are implemented by machining individual ones of said sharp sealing teeth to different heights.

4. The packing ring seal assembly of claim 2 wherein said raised lands and said surfaces between said raised lands are machined on a rotor shaft of the steam turbine.

5. The packing ring seal assembly of claim 1 wherein said seal ring is comprised of a plurality of arcuate segments.

6. The packing sea assembly of claim 1 wherein said radical clearances vary for all of said sharp sealing teeth.

7. A packing ring seal assembly for use in a steam turbine for minimizing leakage flow between stationary and rotating steam path parts comprising:

a stationary annular seal ring having a plurality of axially spaced, annular sealing teeth extending in a radial direction and adapted to cooperate with sealing surfaces on a rotating component of the steam turbine, wherein radial clearances between said sealing teeth and said sealing surfaces vary by predetermined amounts; wherein said sealing surfaces comprise a plurality of raised lands and a plurality of surfaces between said raised lands; and wherein said variations are implemented by machining individual ones of said lands to different diameters.

8. A method of minimizing flow leakage axially along a rotatable machine shaft, between a stationary component surrounding the machine shaft and a plurality of surfaces rotatable with said machine shaft, the method comprising the steps of:

a) providing a labyrinth seal ring having a plurality of axially spaced, annular, sharp sealing teeth;

b) mounting said seal ring above said machine shaft such that said plurality of axially spaced sharp teeth cooperate with surfaces rotatable with said machine shaft; and c) establishing predetermined varying radial clearances between at least some of said axially spaced sharp teeth and said surfaces based on statistical distribution of tooth wear.

9. The method of claim 8 wherein said radial clearances vary between about 0.015 and about 0.045 inch.

10. The method of claim 8 wherein said sealing surfaces comprise a plurality of raised lands and a plurality of surfaces between said raised lands.

11. The method of claim 10 wherein said machine shaft comprises a rotor of a steam turbine.

12. The method of claim 8 wherein said variations are implemented by machining individual ones of said sharp teeth to different diameters.

13. The method of claim 8 wherein said radial clearances vary for all of said sharp sealing teeth.

14. A method of minimizing flow leakage axially along a rotatable machine shaft, between a stationary component surrounding the machine shaft and a plurality of surfaces rotatable with said machine shaft, the method comprising the steps of:

a) providing a labyrinth seal ring having a plurality of axially spaced, annular teeth;

b) mounting said seal ring above said machine shaft such that said plurality of axially spaced teeth cooperate with surfaces rotatable with said machine shaft; and c) establishing predetermined varying radial clearances between said axially spaced teeth and said surfaces; wherein said variations are implemented by machining individual ones of said lands to different diameters.

* * * * *